US010693344B2

(12) United States Patent
Purohit et al.

(10) Patent No.: US 10,693,344 B2
(45) Date of Patent: Jun. 23, 2020

(54) PACKAGING OF A CONTROL MODULE FOR A BRUSHLESS MOTOR

(71) Applicant: Black & Decker Inc., New Britain, CT (US)

(72) Inventors: Madhur M. Purohit, Towson, MD (US); John B. Fogle, White Hall, MD (US); Michael D. Grove, Windsor, PA (US)

(73) Assignee: Black & Decker Inc., New Britain, CT (US)

( * ) Notice: Subject to any disclaimer, the term of this patent is extended or adjusted under 35 U.S.C. 154(b) by 739 days.

(21) Appl. No.: 14/973,226

(22) Filed: Dec. 17, 2015

(65) Prior Publication Data
US 2016/0181892 A1 Jun. 23, 2016

Related U.S. Application Data

(60) Provisional application No. 62/093,803, filed on Dec. 18, 2014, provisional application No. 62/093,785, filed on Dec. 18, 2014.

(51) Int. Cl.
H02K 7/14 (2006.01)
H02K 11/00 (2016.01)
(Continued)

(52) U.S. Cl.
CPC .............. *H02K 7/145* (2013.01); *B25F 5/00* (2013.01); *B25F 5/02* (2013.01); *H02K 1/27* (2013.01);
(Continued)

(58) Field of Classification Search
CPC ........ H02K 11/215; H02K 11/33; H02K 9/06; H02K 11/0073
(Continued)

(56) References Cited

U.S. PATENT DOCUMENTS 7,359,628 B2 4/2008 Broghammer et al.
7,453,179 B2 11/2008 Innami et al.
(Continued)

FOREIGN PATENT DOCUMENTS

EP 2433757 A2 3/2012
IE 2357905 A * 7/2001 ............. H01Q 1/362
(Continued)

OTHER PUBLICATIONS

European Search Report dated Jun. 16, 2016.

*Primary Examiner* — Bernard Rojas
(74) *Attorney, Agent, or Firm* — Amir Rohani

(57) ABSTRACT

A power tool is provided, including a housing; an electric brushless DC motor disposed within the housing; and a control unit disposed within the housing and electrically coupled to the motor. The control unit includes a circuit board, a first set of power switches mounted on a first surface of the circuit board, a second set of power switches mounted on a second surface of the circuit board substantially opposite the first set of power switches and electrically coupled to the first set of power switches forming an inverter bridge circuit, power terminals arranged on a side edge of the circuit board and coupled to the output of the inverter bridge, and a heat sink mounted on the first surface of the circuit board covering the first set of power switches.

12 Claims, 11 Drawing Sheets

(51) Int. Cl.
- *B25F 5/02* (2006.01)
- *H02K 29/08* (2006.01)
- *H02K 1/27* (2006.01)
- *H02K 7/08* (2006.01)
- *H02K 9/06* (2006.01)
- *H02K 11/215* (2016.01)
- *H02K 11/33* (2016.01)
- *H02K 1/28* (2006.01)
- *H02K 5/16* (2006.01)
- *H02K 7/02* (2006.01)
- *B25F 5/00* (2006.01)
- *H02K 1/18* (2006.01)

(52) U.S. Cl.
CPC ............ *H02K 1/2786* (2013.01); *H02K 1/28* (2013.01); *H02K 5/161* (2013.01); *H02K 7/02* (2013.01); *H02K 7/086* (2013.01); *H02K 9/06* (2013.01); *H02K 11/215* (2016.01); *H02K 11/33* (2016.01); *H02K 29/08* (2013.01); *H02K 1/187* (2013.01); *H02K 2203/03* (2013.01)

(58) Field of Classification Search
USPC ............ 310/23, 51, 52, 54, 71, 50, 64, 65; 361/679.52, 679.54
See application file for complete search history.

(56) References Cited

U.S. PATENT DOCUMENTS

| | | |
|---|---|---|
| 8,350,503 B2 | 1/2013 | Kawamura et al. |
| 8,395,337 B2 | 3/2013 | Onishi et al. |
| 8,400,089 B2 | 3/2013 | Bonner et al. |
| 8,604,655 B1 | 12/2013 | Ferran |
| 8,705,242 B2 | 4/2014 | Abe et al. |
| 8,742,708 B2 | 6/2014 | Tsuboi et al. |
| 8,817,469 B2 * | 8/2014 | Macall ................ G02B 6/4261 361/690 |
| 8,879,264 B2 * | 11/2014 | Tsai .................... H05K 7/20454 165/104.33 |
| 2004/0027014 A1 | 2/2004 | Weigold et al. |
| 2007/0153448 A1 | 7/2007 | Okumura et al. |
| 2010/0074881 A1 * | 3/2010 | Boucher .............. A61K 9/0078 424/94.6 |
| 2010/0253162 A1 | 10/2010 | Sakamaki et al. |
| 2011/0171887 A1 * | 7/2011 | Tanimoto ............. B24B 23/028 451/359 |
| 2011/0187211 A1 * | 8/2011 | Matsunaga ............ B25F 5/008 310/50 |
| 2012/0217811 A1 * | 8/2012 | Mari N ................ H02M 3/158 307/71 |
| 2013/0264977 A1 | 10/2013 | Bonner et al. |
| 2013/0342144 A1 | 12/2013 | Alemu |
| 2015/0282337 A1 * | 10/2015 | Ekstrom ................ H01H 21/12 173/170 |
| 2015/0328955 A1 * | 11/2015 | Chauvin ................ B60H 1/24 454/152 |

FOREIGN PATENT DOCUMENTS

| | | |
|---|---|---|
| WO | 2010/087235 A1 | 8/2010 |
| WO | WO-2014154581 A1 * | 10/2014 |

* cited by examiner

PACKAGING OF A CONTROL MODULE FOR A BRUSHLESS MOTOR

RELATED APPLICATION

This disclosure claims the benefit of U.S. Provisional Application No. 62/093,803 filed Dec. 18, 2014 and U.S. Provisional Application No. 62/093,785 filed Dec. 18, 2014, which are incorporated herein by reference in their entirety.

FIELD OF THE DISCLOSURE

This disclosure relates to power tools. More particularly, the present invention relates to a control module for a brushless motor in power tools.

BACKGROUND

Use of cordless power tools has increased dramatically in recent years. Cordless power tools provide the ease of a power assisted tool with the convenience of cordless operation. Conventionally, cordless tools have been driven by Permanent Magnet (PM) brushed motors that receive DC power from a battery assembly or converted AC power. The motor associated with a cordless tool has a direct impact on many of the operating characteristics of the tool, such as output torque, time duration of operation between charges and durability of the tool. The torque output relates to the capability of the power tool to operate under greater loads without stalling. The time duration of the power tool operation is strongly affected by the energy efficiency of the motor. Since, during some operating modes cordless tools are powered by battery modules that contain a limited amount of energy, the greater the energy efficiency of the motor, the longer the time duration that the tool can be operated. The durability of a power tool is affected by many factors, including the type of motor that is used to convert electrical power into mechanical power.

Brushed motors such as the PM brushed motors that are generally employed in power tool applications are susceptible to damaged brushes over time. The main mechanical characteristic that separates Permanent Magnet brushless motors from Permanent Magnet brushed motors is the method of commutation. In a PM brushed motor, commutation is achieved mechanically via a commutator and a brush system. Whereas, in a brushless DC motor, commutation is achieved electronically by controlling the flow of current to the stator windings. A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator core includes field windings around the rotor. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. A set of sense magnets coupled to the PMs in the rotor assembly are sensed by a sensor, such as a Hall Effect sensor, to identify the current position of the rotor assembly. Proper timing of the commutation sequence is maintained by monitoring sensors mounted on the rotor shaft or detecting magnetic field peaks or nulls associated with the PM.

While some power tool applications such as hammer drills require high power motors, some power tools such as certain fastening tools require less power output from the motor. For example, a finish nailer requires less energy as compared to other nailing applications such as framing, fencing or concrete. This is because finish nails are relatively thin (16 Ga or 18 Ga) and require less energy to be fired, whereas, by comparison, concrete nails are thicker and require joining steel beams with concrete, and therefore require more energy.

The main user critical-to-quality requirement for a finish nailer is small size and light weight. Thus, in such power tool applications it is important to assemble and package motor components, including the motor and the control module, in a compact and efficient manner. What is needed is a control module that is packaged and assembled compactly and efficiently.

Furthermore, various applications have different levels of thermal management requirement associated with the power requirement of the tool, even though the control methods for these applications are functionally similar. What is needed is a control module design that can be easily configured to meet various thermal requirements of the power tool with minimal level of modification.

BRIEF DESCRIPTION OF THE DRAWINGS

The drawings described herein are for illustration purposes only and are not intended to limit the scope of this disclosure in any way.

SUMMARY

Figure 1:
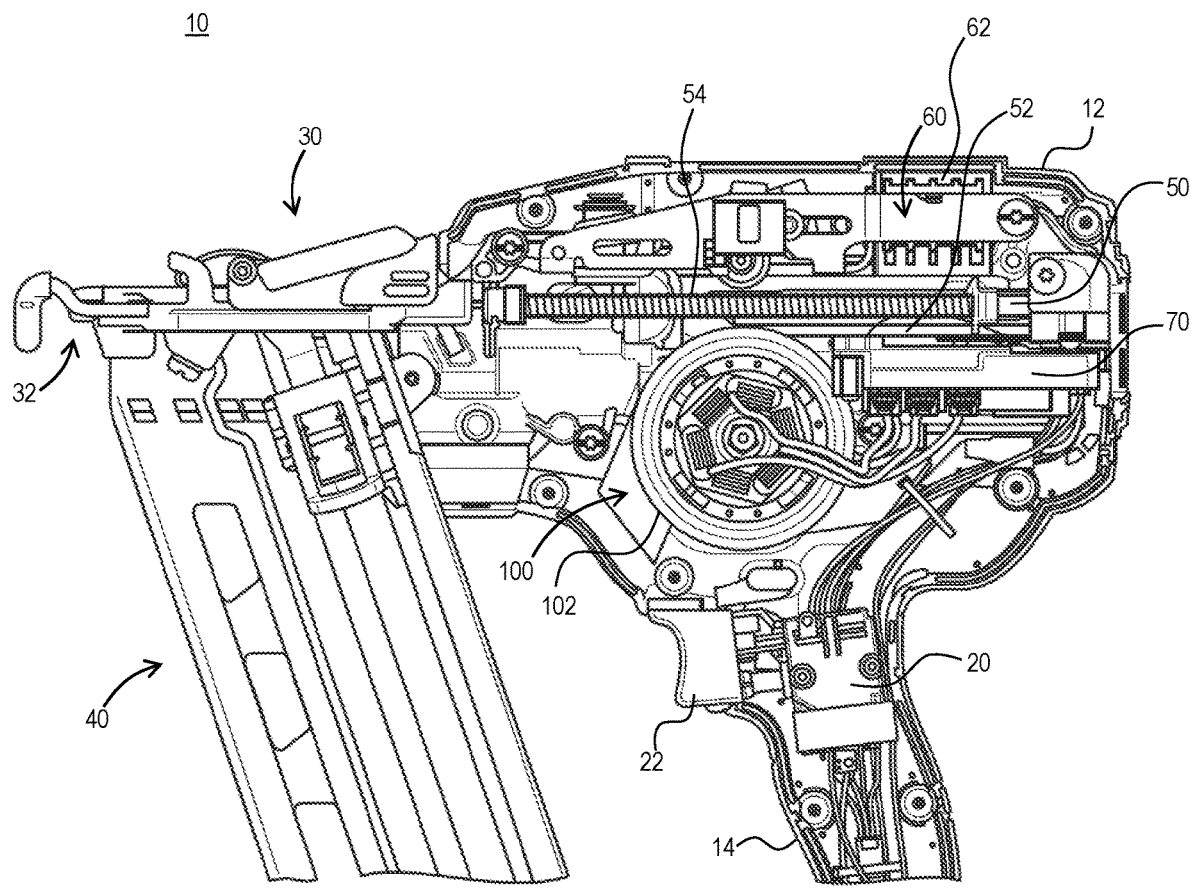
FIG. 1 depicts a side view of a power tool (e.g., fastening tool) with a housing half removed, according to an embodiment.

According to an embodiment of the invention, a power tool is provided, including a housing; an electric brushless DC motor disposed within the housing; and a control unit disposed within the housing and electrically coupled to the motor. In an embodiment, the control unit includes a circuit board, a first set of power switches mounted on a first surface of the circuit board, a second set of power switches mounted on a second surface of the circuit board substantially opposite the first set of power switches and electrically coupled to the first set of power switches forming an inverter bridge circuit, a set of power terminals arranged on a side edge of the circuit board and coupled to the output of the inverter bridge, and a heat sink mounted on the first surface of the circuit board covering the first set of power switches.

In an embodiment, the control unit includes a first upper conductive track on the first surface of the circuit board electrically coupling first nodes of the first set of power switches together, and a set of second upper conductive tracks on the first surface of the circuit board electrically coupling second nodes of the first set of power switches to the power terminals.

In an embodiment, the heat sink is mounted on and electrically coupled to the first upper conductive track.

In an embodiment, the control unit further includes a first lower conductive track on the second surface of the circuit board electrically coupling first nodes of the second set of power switches together, and a set of second lower conductive tracks on the second surface of the circuit board electrically coupling second nodes of the second set of power switches to the power terminals.

In an embodiment, the control unit further includes through-holes through the circuit board between the second upper conductive tracks and the second lower conductive tracks near the side edge of the circuit board, and the power terminals are secured to the through-holes. In an embodiment, the through-holes include conductive vias electrically connecting the second upper conductive tracks and the second lower conductive tracks.

In an embodiment, the first set of power switches comprise high-side field-effect transistors (FETs), the second set of power switches comprise low-side FETs, the first upper conductive track is coupled to drains of the high-side FETs, the first lower conductive track is coupled to sources of the low-side FETs and the power terminals are coupled to sources of respective high-side FETs and drains of respective low-side FETs.

In an embodiment, the first upper conductive track and the first lower conductive track are respectively coupled to positive and negative terminals of a power source.

In an embodiment, heat generated by the second set of power switches is substantially dissipated by the power terminals.

In an embodiment, the tool comprises at least one of a finishing nailer, a framing nailer, or a concrete nailer.

In an embodiment, the control unit further includes a controller electrically coupled to gates of the first set of power switches and gates of the second set of power switches.

In an embodiment, the control unit further includes a potting boat in which the circuit boat is disposed, and potting material substantially covering both surfaces of the circuit board but leaving a surface of the heat sink exposed.

In an embodiment, the control unit further includes a thermally-conductive thermally-isolating pad disposed over the heat sink and at least a portion of the power terminals, and a secondary heat sink disposed over the pad to be in thermal communication the heat sink and the power terminals.

In an embodiment, the secondary heat sink has three to six times the total size of the heat sink. In an embodiment, the secondary heat sink includes upwardly projecting fins.

DETAILED DESCRIPTION

FIG. 1 depicts a side view of a fastening tool 10 (e.g., a nailer) with a housing half removed, according to an embodiment. The fastening tool 10 shown herein includes an outer-rotor brushless DC motor 100. The outer rotor of the motor 100 is integrally formed with a flywheel 102. In an embodiment, the fastening tool 10 further includes a housing 12, an input unit 20 housed within a handle 14 of the housing 12, and a control unit 70. In an embodiment, control unit 70 includes a micro-controller or other programmable control module and power switching components for controlling a commutation of the motor 100. Control unit 70 is coupled to a power source (not shown), which may be a DC power source (e.g., a removable battery pack) or an AC power source (e.g., a 120V AC). The control unit 20 is also coupled to the input unit 20 and regulates a supply of power from the power source to the motor 100 based on a logic signal from the input unit 20.

In an embodiment, fastening tool 10 further includes a nosepiece assembly 30 including a contract trip mechanism 32 coupled to the housing 12, a magazine assembly 40, a driver assembly 50 including a driver 52 and a return mechanism 52, an activation assembly 60, and a solenoid 62, among other components. In an embodiment, actuation of the actuator 22 while contact trip mechanism 32 is in contact with a workpiece causes the solenoid 62 to engage the activation assembly 62. Activation assembly 62 translates forward and engages the driver 52 to initiate driving engagement between the driver 52 and the flywheel 102. In an embodiment, the flywheel 102 includes one or more flywheel rings that form one or more grooves around the outer surface of the flywheel 102. The driver 52 includes corresponding railings that engage the grooves of the flywheel. Rotation of the flywheel 102 causes the driver 52 to accelerate axially and drive a fastener into a workpiece.

The present disclosure is focused on the structure and features of the control unit 70. Details of the components and operation of an exemplary fastening tool are beyond the scope of this disclosure and can be found in U.S. Pat. No. 6,971,567 and US. Patent Publication No. 2012/0097729, both of which are incorporated herein by reference in their entirety. It is further noted that while the motor 100 of this disclosure is described with reference to a fastening tool according to an exemplary embodiment, motor 100 may similarly be used in other power tools and other rotary devices.

It is noted herein that while the present disclosure is described with reference to a fastening tool, the motor control assembly and packaging discussed herein can be used with any brushless control application, particularly in any power tool application. For example, the control module of this disclosure may be used with a brushless motor in a drill, impact driver, grinder, saw, or any other power tool.

Figure 2:
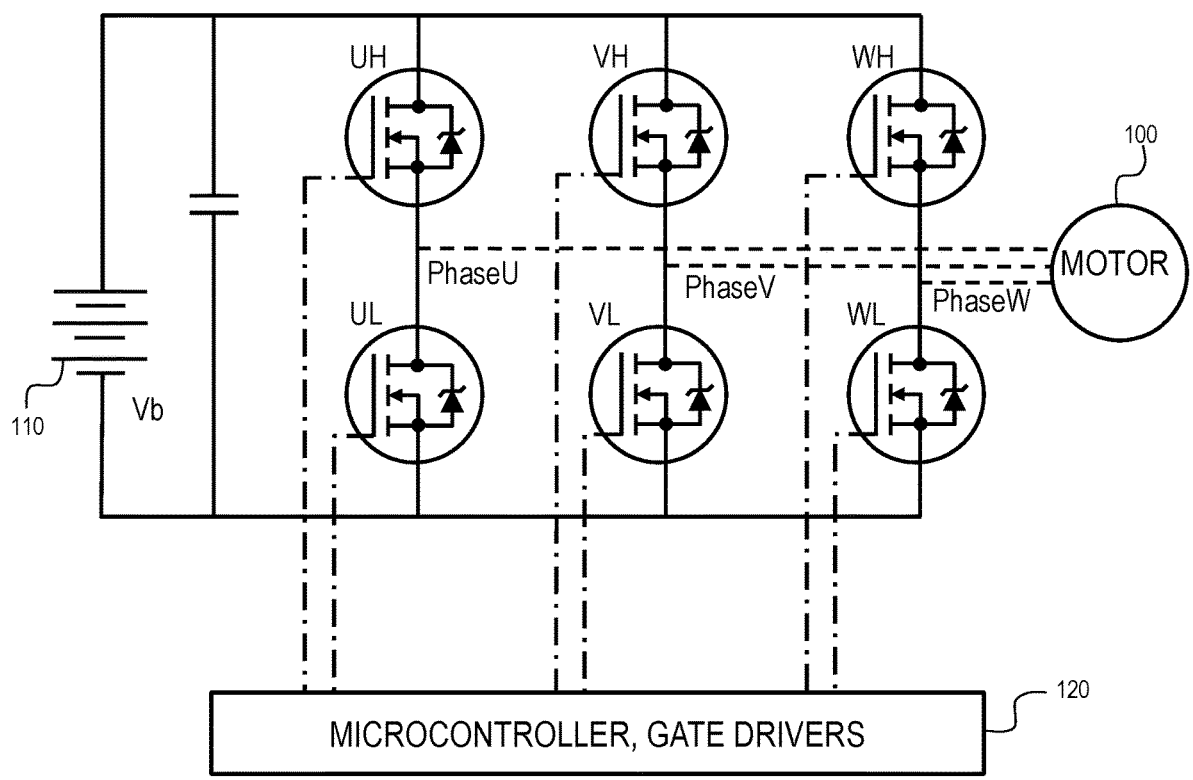
FIG. 2 depicts a simplified circuit diagram of a three-phase inverter bridge to generate a six step commutated three phase voltage for BLDC motor control, according to an embodiment.

FIG. 2 depicts a simplified circuit diagram 200 of a three-phase inverter bridge to generate a six step commutated three phase voltage for BLDC motor control. In an embodiment, this circuit may be provided as a part of the control unit 70. As shown in this figure, the circuit includes three high-side power switches UH, VH, WH, and three low-side power switches, UL, VL, WL. The power switches may be, for example, Metal Oxide Field Effect Transistors (MOSFETs, or FETs for short), as shown in FIG. 2, through it must be understood that Insulated-Gate Bipolar Transistors (IGBTs), Bipolar Junction Transistors (BJTs), or similar semiconductor switches may be alternatively utilized. In this example, six N-channel FETs are being utilized for the inverter bridge circuit 200. While this disclosure makes references to FETs, it should be understood that any such power switches may be alternatively used. The gates of the power switches may be controlled by a microcontroller in the control unit 70 coupled to a set of gate drivers.

As shown in FIG. 2, the drains of all the high-side power switches UH, VH, WH are coupled to the B+ terminal of the battery, and the sources of the low-side power switches UL, VL, WL are coupled to the B− terminal of the battery 110. The sources of each of the high-side power switches UH, VH, WH and the drains of the corresponding low-side power switches UL, VL, WL are commonly coupled to PhaseU, PhaseV, and PhaseW signals. These signals are the power lines provided to the terminals of the three-phase brushless motor 100, supplying electric power to drive the motor 100. The gates of the power switches are coupled to the microcontroller and gate driver circuit 120.

In conventional designs, the high-side and low-side power switches are arranged on a printed circuit board (PCB) and routed via metal routings on the PCB. In may power tool applications, particularly high power applications, the power switches (particularly high-side power switches) generate substantial amount of heat. Therefore, the PCB is typically disposed next to a large heat sink to dissipate heat away from the power switches. This arrangement occupies too much space and is not practical for power tool applications where space is limited.

Figure 3A:
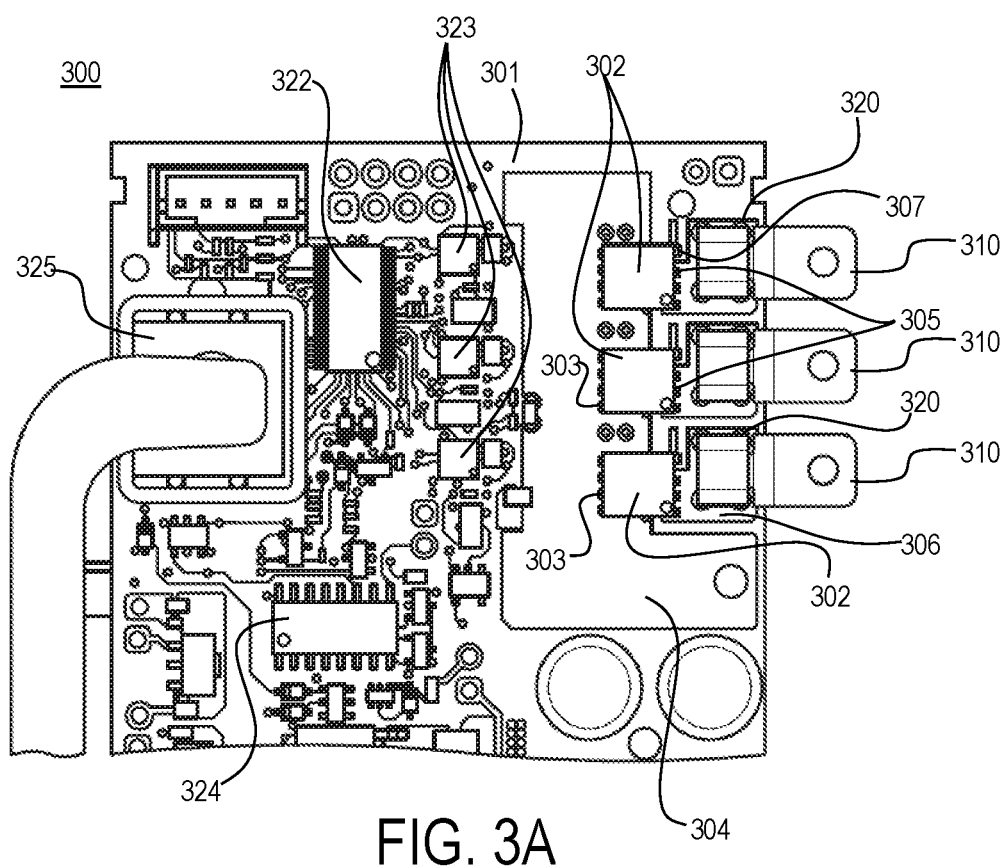
FIGS. 3A and 3B depict partial first and second surface views of a control module printed circuit board (PCB) including power switches (herein referred to as FETs), according to an embodiment.
Figure 3B:
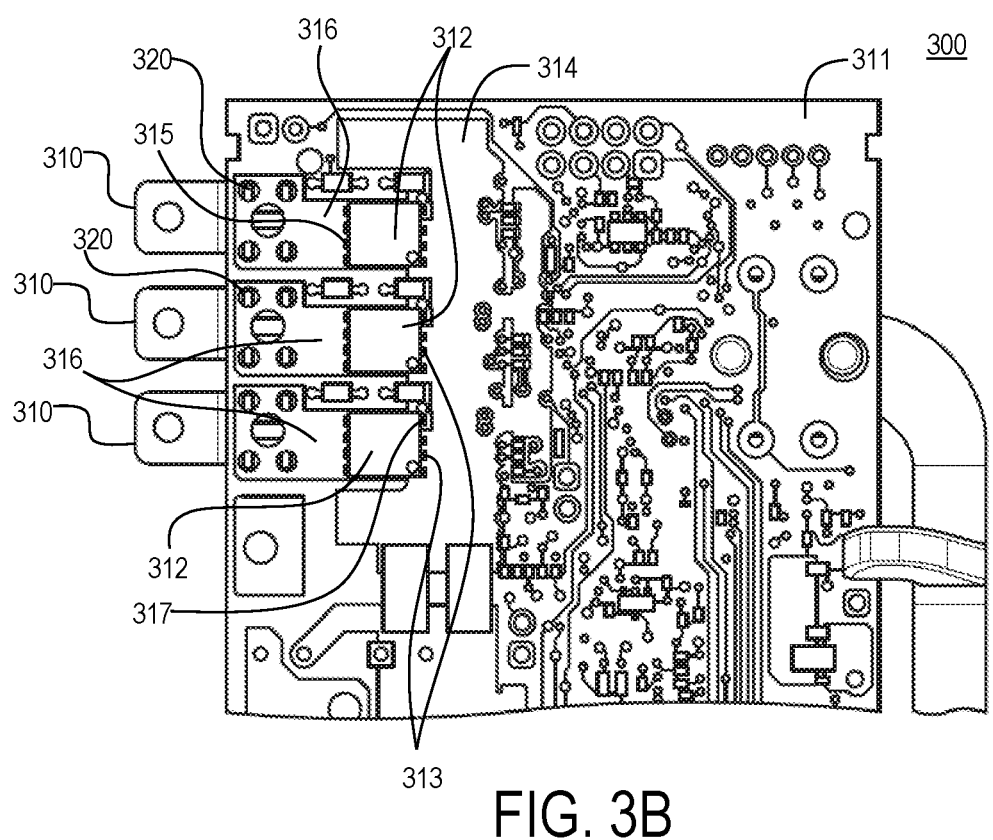

FIGS. 3A and 3B depict partial first and second surface views of an improved printed circuit board (PCB) 300 for control unit 70 including power switches (herein referred to as "FETs") according to an embodiment. In an embodiment, the high-side FETs 302 are mounted on the first surface (i.e., top surface) 301 of the PCB 300, and low-side FETs 312 are mounted on the second surface (i.e., bottom surface) 311 of the PCB 300 substantially in mirror opposite of the high-side FETs 302. Three motor power terminals 310 are arranged near a side edge of the PCB 300. The drains 303 of the three high-side FETs 302 are all mounted on and electrically coupled to a conductive track 304 on the top surface of the PCB 300. An area of conductive track 304 is substantially larger than the area underlying each of the FETs 302. In an embodiment where the control unit 70 is used in low power applications, the FETs 302 are 5×6 mm QFN (Quad Flat No-leads) package and conductive track 304 occupy an area greater than 300 mm2, preferably between 300-550 mm2. In an embodiment, conductive track 304 may extend under the FETs 302.

The sources 313 of the three low-side FETs 312 are similarly all mounted on and electrically coupled to a conductive track 314 on the bottom surface 311 of the PCB. An area of conductive track 314 is also substantially larger than the area underlying each of the FETs 312. In an embodiment, conductive tracks 304 and 314 are respectively electrically coupled to the positive and negative terminals of the power source. For example, in an embodiment where the power tool is powered by a battery pack, conductive tracks 304 and 314 are respectively electrically coupled to the B+ and B− terminals of the battery pack. It is noted that the routing of the conductive tracks 304 and 314 to the power source terminals is not specifically depicted in this figure, but can be made via known routing methods as would be understood by a person of ordinary skill in the art of circuit board design.

In an embodiment, the sources 305 of high-side FETs 302 are individually coupled to corresponding conductive tracks 306 disposed near the edge of the top surface 301 of PCB 300. Respective conductive tracks 306 are electrically isolated from one another. Drains 315 of low-side FETs 312 are similarly individually coupled to corresponding conductive tracks 316 on the bottom surface 311. Respective conductive tracks 316 are also electrically isolated from one another. Respective conductive tracks 306 and 316 are substantially mirror opposite of one another on the top and bottom surfaces 301 and 311 of the PCB 300. In an embodiment, several through-holes 320 are provided between the top surface 301 and bottom surface 311 of the PCB 300 in the area where the conductive tracks 306 and 316 are located. In an embodiment, power terminals 310 are mounted over corresponding conductive tracks 306 on the top surface 301 of the PCB 300. In an embodiment, through-holes 320 include conductive vias that electrically coupled the conductive tracks 306 and 316. Additionally or alternatively, each terminal includes legs (four legs in this embodiment) that penetrate through the through-holes 320 and are crimped over conductive tracks 316 on the bottom surface 311 of the PCB 300. In this manner, the terminal legs not only mechanically secure the terminals 310 to the PCB 301, but also electrically connect corresponding conductive tracks 306 and 316. The terminal legs thus provide the electrical connectivity between the sources 305 of the high-side FETs 302 and corresponding drains 315 of the low-side FETs 312. Terminals 310 provide the PhaseU, PhaseV, and PhaseW signals depicted in FIG. 2 to the motor 100.

In an embodiment, gates 307 of the high-side FETs 302 and gates 317 of the low-side FETs 312 are electrically connected via metal routings through an inner surface of the PCB 300 to a controller 322, as discussed below.

In an embodiment, in lower power applications, the FETs 302 and 312 may be small with very low Rds-ON (drain-to-source resistance in saturation) and very low junction-to-tab thermal resistance, soldered to the PCB 300. Thus the FETs generate low heat and transfer the heat quickly to the PCB 300. Accordingly, a relatively small heat sink is sufficient to effectively carry heat away from the FETs 302 and 312.

Figure 4:
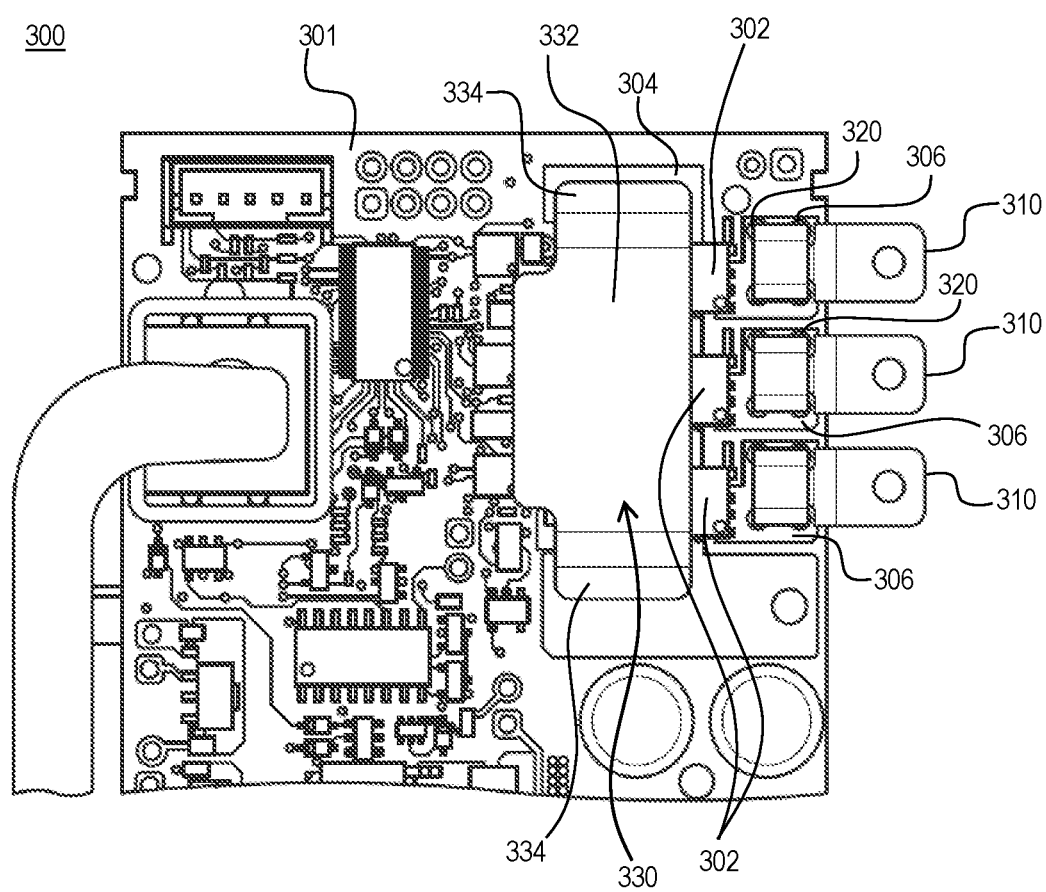
FIG. 4 depicts a partial surface view of the PCB with a heat sink mounted on the top surface, according to an embodiment.

FIG. 4 depicts a top view of the PCB 300 showing a heat sink 330 mounted on the top surface 301 of the PCB 300, according to an embodiment. In an embodiment, heat sink 330 includes a main body 332 having a planer shape mounted so as to cover a top surface of the high-side FETs 302 and two legs 334 extending downwardly from the main body 332 towards the top surface 301 of the PCB 300 and securely mounted onto to conductive track 304 on two ends of the array of high-side FETs 302. This allows heat to be transferred with very low thermal resistance network from the high-side FETs 302 to the heat sink 330. In an exemplary embodiment, heat sink 330 has a surface area in the range of 100-500 mm2, preferably in the range of 250-400 mm2.

Furthermore, since drains 305 of low-side FETs 312 are connected to terminals 310, as discussed above, terminals 310 additionally act as heat sinks to transfer heat away from the low-side FETs 312. This allows heat to be transferred with very low thermal resistance network from the low-side FETs 312 to the terminals 310, which have a sufficiently large surface area to effectively carry heat away from the low-side FETs 312. In an embodiment, terminals 310 together have a total surface metal area in the range of 100-200 mm2.

Figure 5:
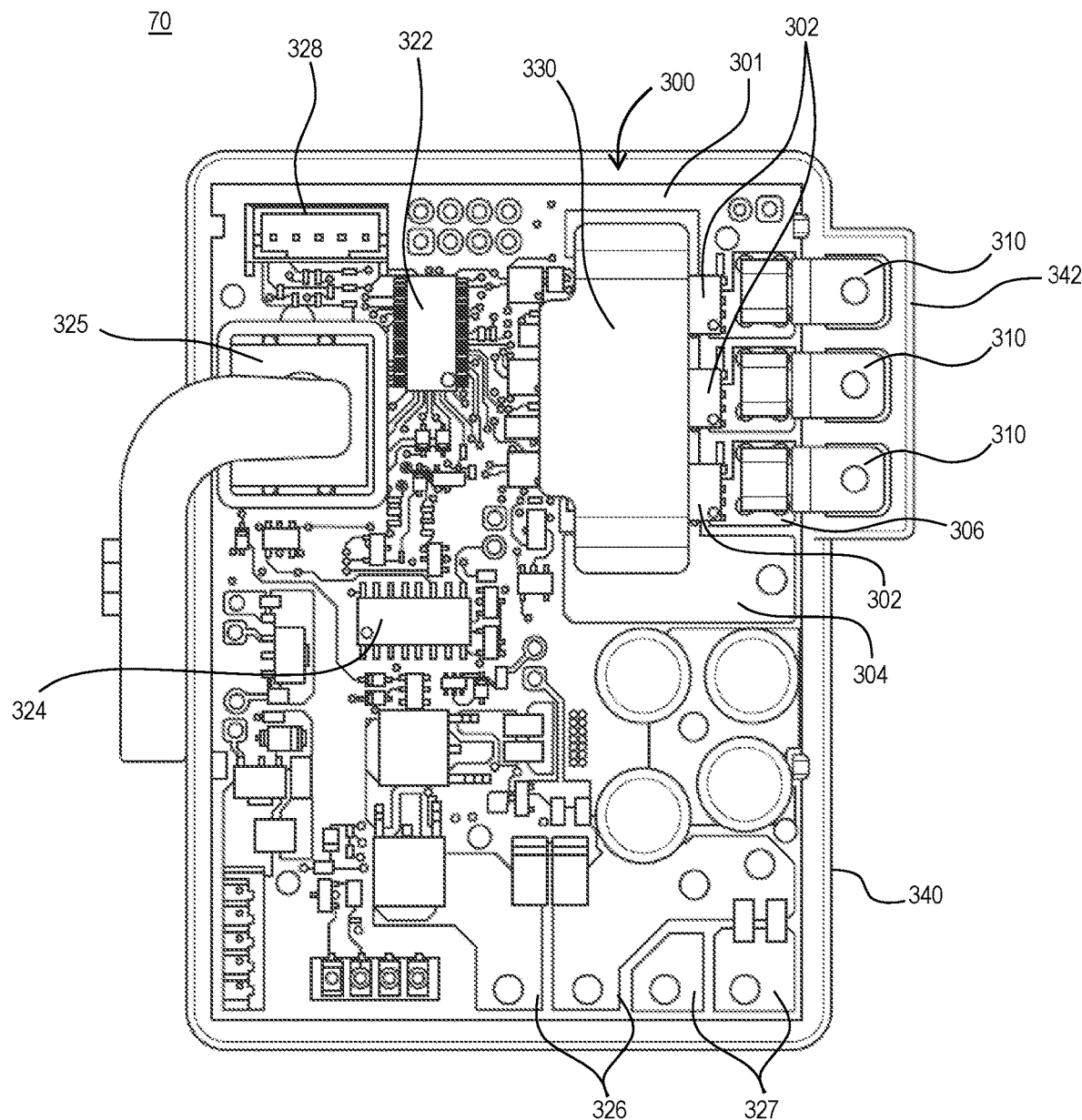
FIG. 5 depicts a top view of the control module including the PCB fully placed inside a potting boat, according to an embodiment.
Figure 6:
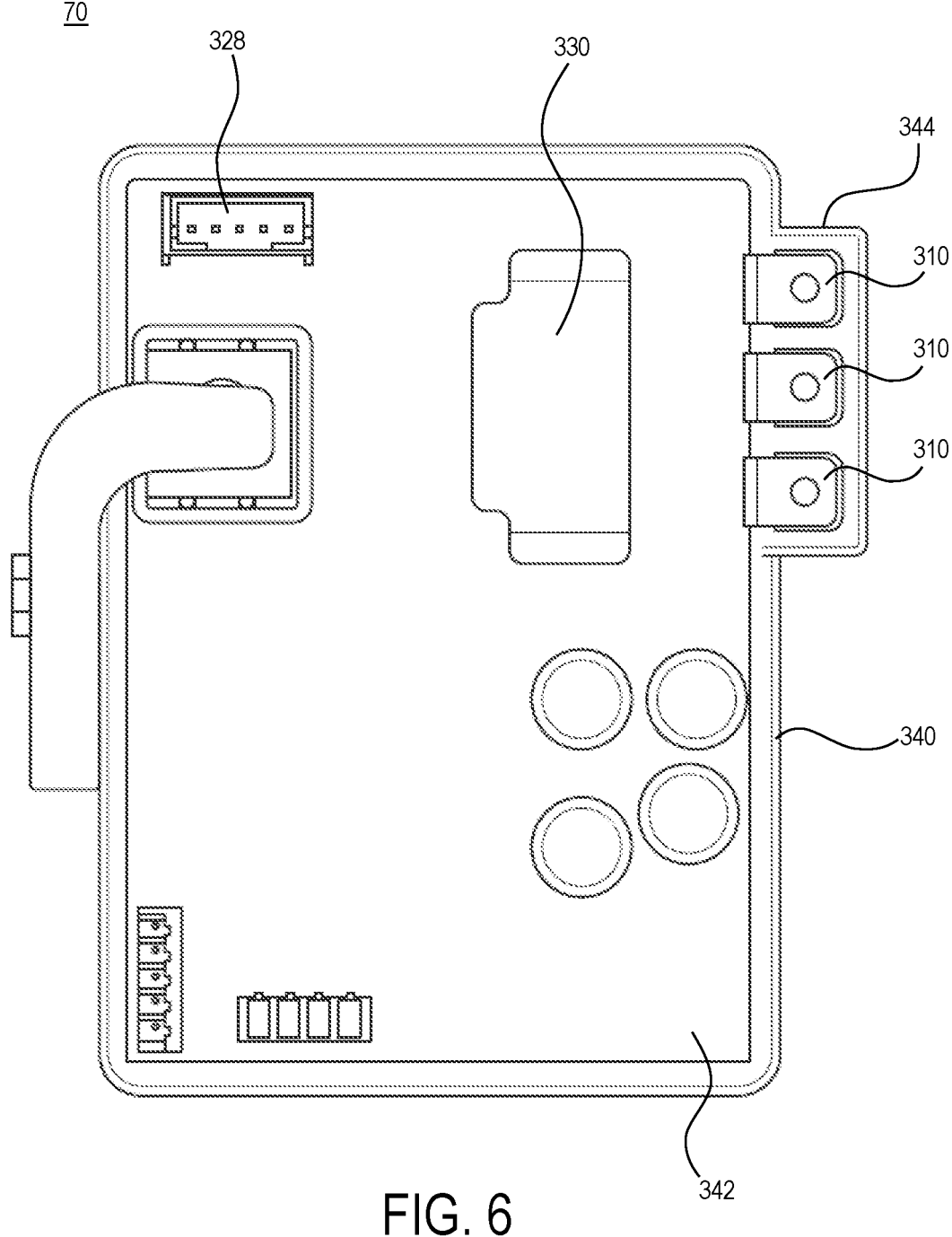
FIG. 6 depicts a top view of the control module with the PCB potted inside the potting boat, according to an embodiment.

FIG. 5 depicts the control unit 70 including the PCB 300 fully placed inside a potting boat 340. FIG. 6 depicts the control module with the PCB 300 potted with potting material 342 inside the potting boat 340. In an embodiment, a wall of the potting boat 340 includes an opening (i.e., recessed portion from the top edge of the wall) through which terminals 310 extend outside the main body of the potting boat 340. Extending from the potting boat 340 is an extruded terminal housing portion 344 that extends from the opening around the terminals 310 to contain the terminals 310 therein. Motor wires can be easily attached (e.g., soldered or screwed) to the terminals 310 providing a robust high current, low profile interconnection outside the main area of the potting boat 340 that is both reliable and space saving. When potting material 342 is fully applied, a top surface of the heat sink 330 is exposed over the top surface of the potting material 342, and the terminals are exposed within the terminal housing portion 344.

Referring to FIGS. 3A to 5, in an embodiment, controller 322 is a microcontroller, a microprocessor, or other programmable semiconductor chip mounted on the PCB 300. Alternatively, controller 322 may be an Application Specific Integrated Circuit (ASIC). Controller 322 is programmed or configured to control the switching of gates 307 and 317 of the high-side FETs 302 and low-side FETs 312 to control the commutation of the motor 100. The controller 322 may integrally include gate drivers for driving the high-side and low-side FETs 302, 312. Alternatively, discrete gate driver chips 323 disposed between the controller 322 and high-side and low-side FETs 302, 312. Controller 322 may be further coupled, via a decoder chip 324, to a contact switch 325, which in turn is coupled to the contact rip mechanism 32 of the power tool 10. In an embodiment, controller 322 is coupled to positional sensors (e.g., hall sensors, not shown) of the motor 100 via a connector 328.

In an embodiment, drains of high-side FETs 302 and sources of low-side FETs 312 are coupled to respective conductive tracks 327, which are in turn coupled to B+ and B− battery terminals, thus supplying power to the three-phase inverter circuit 200. Furthermore, conductive tracks 326, which are coupled to the solenoid 62, are coupled to the controller 322 and activated when the contact switch 325 is activated via the contact rip mechanism 32.

Figure 7:
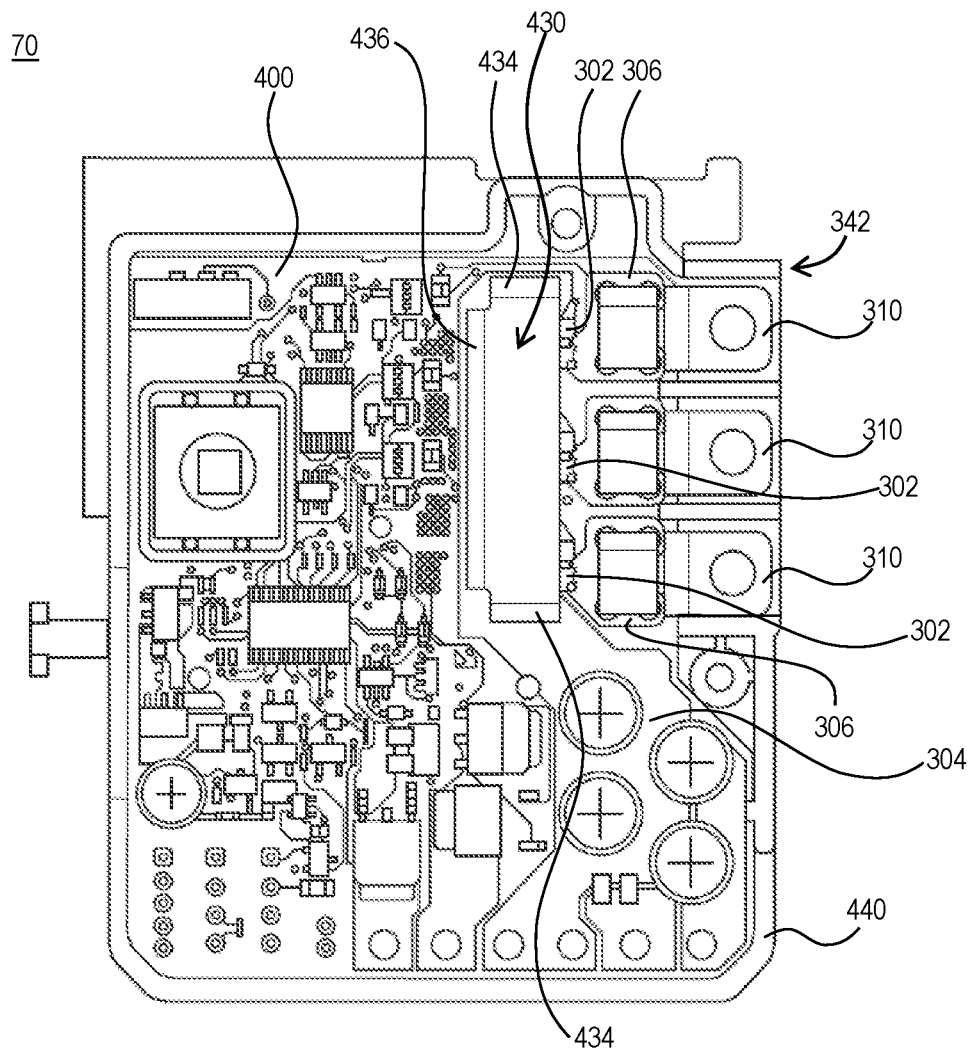
FIG. 7 depicts a top view of a control module having an alternative potting boat and PCB arrangement, according to an embodiment.

FIG. 7 depicts an alternative potting boat 440 and PCB 400, according to an embodiment. In this embodiment, the potting boat 440 and PCB 400 are shaped such that the terminals 310 do not project out of control unit 70. Instead, the terminal housing portion 342 is formed as a part of a wall of the potting boat 440. The wall of the potting boat 440 where the terminal housing portion 342 is located is made thicker than the rest of the potting boat, with slots that receive the terminals 310. It is further noted that the high-side FET heat sink 430 shown herein is shaped differently and includes two legs 434 mounted on the conductive track 304 on both sides of the array of high-side FETs 302, as well as an elongated third leg 436 mounted on the conductive track 304 along the side of the array of high-side FETs 302 opposite the terminals 310. While the shape of the heat sink 430, the PCB 400, and the potting boat 440 in this embodiment is different from the previous embodiment, the arrangement of power switches, conductive tracks, and terminals is substantially the same.

A further embodiment of the invention is discussed with reference to FIGS. 8-10 and with continued reference to FIG. 7.

As previously mentioned, various power tool applications have different power requirements. For example, there are various fastener tools including, but not limited to, finishing nailers, framing nailers, concrete nailers, etc. These power tools utilize different nails (both in terms of diameter and length) used on different work pieces (i.e., drywall, wood, metal, concrete, etc.). This leads to various fastening tools having different power requirements. As a result, these applications have different levels of thermal management requirement, meaning that given similar power components, some power tool lines require larger heat sinks than others. It is too costly to redesign the entire control module only to satisfy the heat sink size requirement.

In an embodiment of the invention, the control unit 70 of FIGS. 1-7 is utilized for different fastening tool applications having different thermal requirements. As will be understood by those skilled in the art, higher power fastening tools may also require larger power switching components. In this embodiment, it is assumed that suitable high-side and low-side power switches 302 and 312 capable of handling the power requirement of the fastening tool 10 are being utilized.

According to an embodiment of the invention, in fastening tool 10 applications the power requirement of the motor 100 is not significant, a relatively small heat sink may be utilized. FIG. 7 discussed above in detail depicts an exemplary control unit 70 wherein the heat sink 430 effectively dissipates heat away from the high-side FETs 302 despite its relative small size. The exemplary heat sink 430 of FIG. 7 may be utilized in applications such as, but not limited to, finishing nailers.

According to an embodiment, where the motor 100 has higher power requirement and thus a larger heat sink is required, the same control unit 70 may be utilized without modifying the circuit arrangement and the size of the PCB 400, using a secondary heat sink mounted on top of the primary heat sink 430 to increase the overall heat transferability from the FETs.

Figure 8:
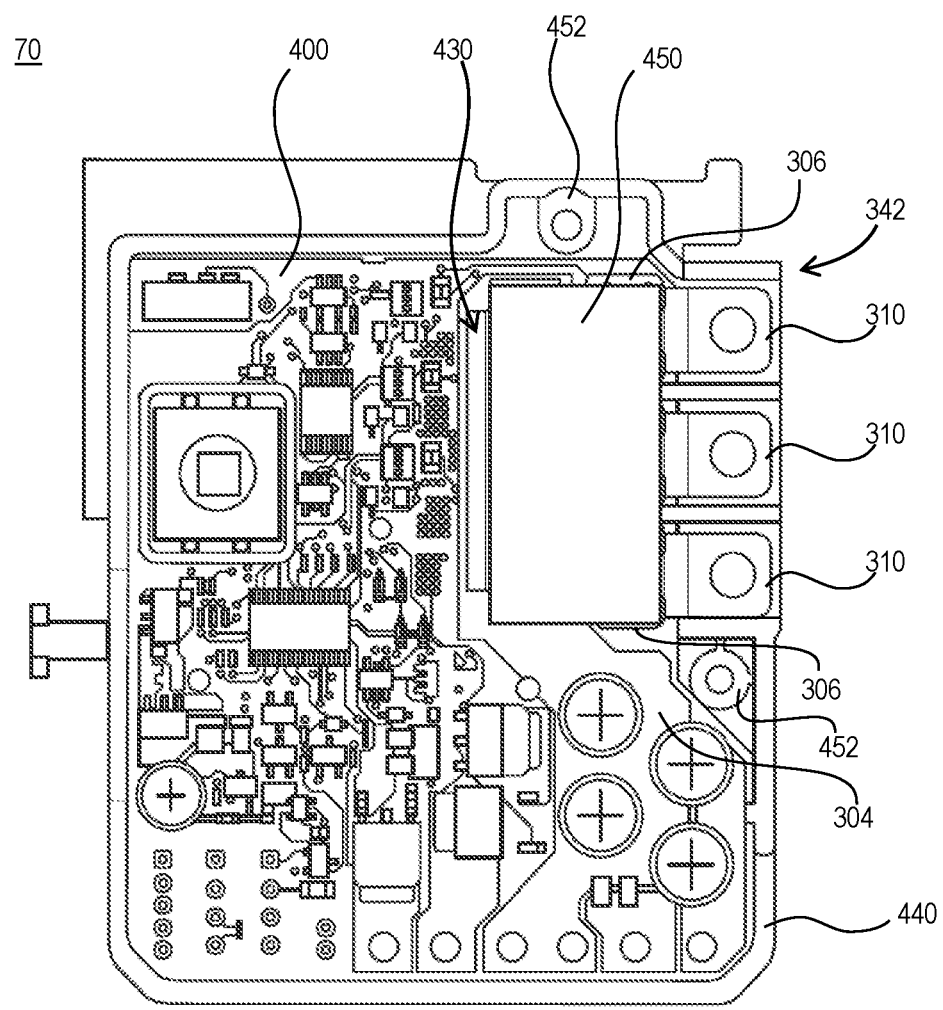
FIG. 8 depicts the PCB of FIG. 7 with a thermally-conductive electrically-insulating pad disposed on top of the primary heat sink, according to an embodiment.

In an embodiment, as shown in FIG. 8, in order to ensure that the secondary heat sink does not electrically short power terminals 310 or conductive tracks 306, a thermally-conductive electrically-isolating gap pad 450 is arranged on top of the primary heat sink 430. The gap pad 450 also covers ends of the terminals 310 and conductive tracks 306.

Figure 9:
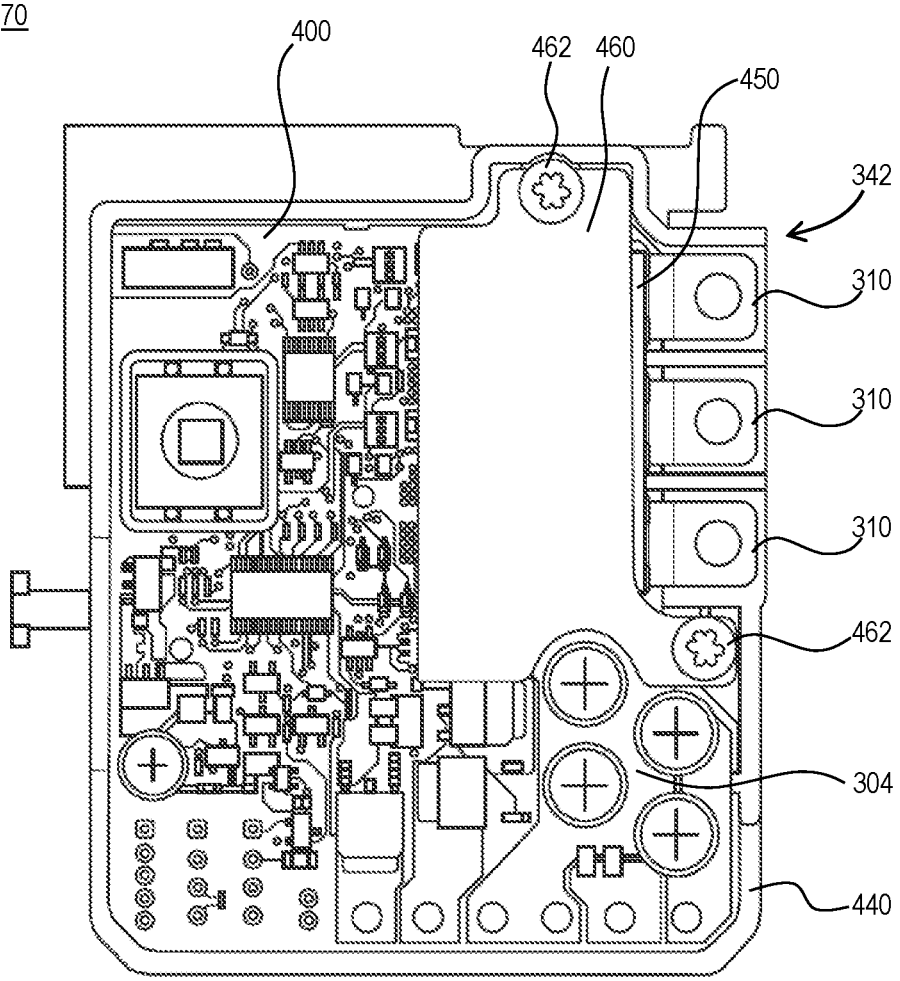
FIG. 9 depicts the PCB of FIG. 8 with a secondary heat sink disposed on top of the primary heat sink with the pad disposed therebetween, according to an embodiment.
Figure 10:
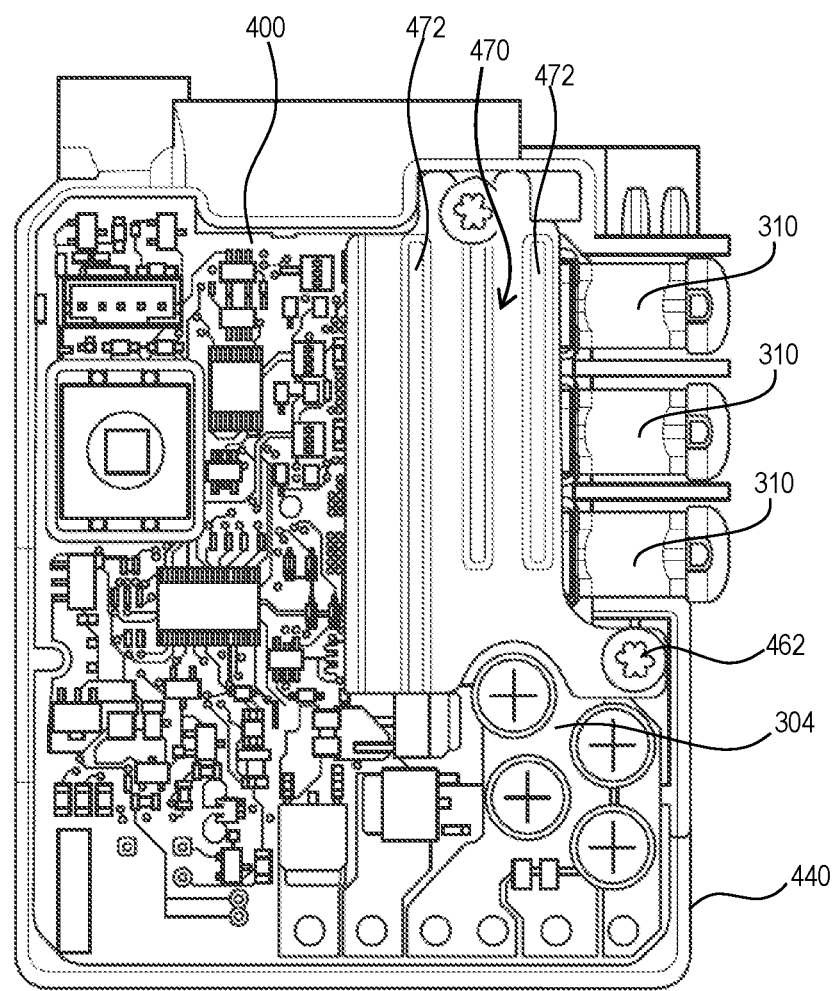
FIG. 10 depicts the PCB of FIG. 9 with an alternative secondary heat sink, according to an embodiment.

Thereafter, in an embodiment, as shown in FIG. 9, a secondary heat sink 460 is disposed over the gap pad 450. Secondary heat sink 460 may be secured to the potting boat via fasteners (i.e., screws) 462, in an embodiment. Secondary heat sink 460 helps transfer a substantially larger amount of heat away from the FETs 302 through the primary heat sink 430 and the gap pad 450. In an embodiment, secondary heat sink 460 is larger than primary heat sink 430. In an embodiment, secondary heat sink 460 may have 3-6 times the total size (i.e, mass or surface area) of the primary heat sink 430, although secondary heat sink 460 of any size is within the scope of the invention. The exemplary heat sink 460 of FIG. 9 may be utilized in applications such as, but not limited to, framing nailers.

Although secondary heat sink 460 shown herein is flat, it is envisioned that heat sinks of different shapes and sizes, e.g., heat sinks including projecting fins to increase surface area, may be utilized for higher-power applications (e.g., concrete nailers) within the scope of the invention. FIG. 10 depicts one such secondary heat sink 470 including vertically-extending fins 472 extending from an outer surface of the secondary heat sink 470, according to an embodiment of the invention. With the heat sink shown herein, continuous power loss density of 20,000 W/m2 (2 W/cm2) may be achieved, according to an embodiment. According to an embodiment, the size, shape, and overall volume of the secondary heat sink 470 may be modified based on the power and thermal management requirements of the tool without modifying the shape of the control unit 70, including the potting boat 440, PCB 400, or the primary heat sink 430.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
   a housing;
   an electric brushless DC motor disposed within the housing; and
   a control unit disposed within the housing and electrically coupled to the motor, the control unit comprising:
      a circuit board having a first surface and a second surface;
      a first plurality of discrete conductive tracks disposed at or near an edge of the circuit board on the first surface of the circuit board and spaced apart along an axis;
      a first main conductive track mounted on the first surface of the circuit board parallel to the axis forming an elongated gap parallel to the axis between the first main conductive track and the first plurality of discrete conductive tracks on the circuit board;
      a first plurality of power switches mounted on the first surface of the circuit board, each of the first plurality of power switches including a first portion mounted on the first main conductive track, a second portion mounted on a respective one of the first plurality of discrete conductive tracks, and a third portion mounted on the elongate gap between the first main conductive track and the first plurality of discrete conductive tracks;
      a second plurality of power switches mounted on a second surface of the circuit board substantially opposite the first plurality of power switches and electrically coupled to the first plurality of power switches forming an inverter bridge circuit;
      a plurality of power terminals arranged on a side edge of the circuit board and coupled to the output of the inverter bridge, the plurality of power terminals being spaced apart along the axis with each power terminals being electrically contacted a respective one of the first plurality of discrete conductive tracks; and
      a heat sink including at least one leg mounted on the first main conductive track on the first surface of the circuit board and a main body extending at least partially over at least the first portion of each of the first plurality of power switches;
      a second main conductive track mounted on the second surface of the circuit board coupling first nodes of the second plurality of power switches together;
      a second plurality of discrete conductive tracks disposed on the second surface of the circuit board substantially opposite the first plurality of discrete conductive tracks parallel to the axis electrically coupling second nodes of the second plurality of power switches to the plurality of power terminals;
      a plurality of through-holes through the circuit board between the first and second pluralities of discrete conductive tracks near the side edge of the circuit board, the plurality of power terminals being secured to the plurality of through-holes, wherein the plurality of through-holes comprise conductive vias electrically connecting respective ones of the first and second pluralities of discrete conductive tracks,
      wherein each of the plurality of power terminals is mounted over a respective one of the first plurality of conductive tracks and includes a plurality of legs received through the plurality of through-holes and crimped over a respective one of the second plurality of conductive tracks.

2. The power tool of claim 1, wherein the first main conductive track electrically couples first nodes of the first plurality of power switches together, and the first plurality of discrete conductive tracks electrically couple second nodes of the first plurality of power switches to the plurality of power terminals.

3. The power tool of claim 1, wherein the heat sink comprises an elongate leg and two side legs mounted on and electrically coupled to the first main conductive track.

4. The power tool of claim 1, wherein the first plurality of power switches comprise high-side field-effect transistors (FETs), the second plurality of power switches comprise low-side FETs, the first main conductive track is coupled to drains of the high-side FETs, the second main conductive track is coupled to sources of the low-side FETs, and the plurality of power terminals are coupled to sources of respective high-side FETs, and drains of respective low-side FETs.

5. The power tool of claim 1, wherein the first main conductive track and the second main conductive track are respectively coupled to positive and negative terminals of a power source.

6. The power tool of claim 1, wherein heat generated by the second plurality of power switches is substantially dissipated by the plurality of power terminals.

7. The power tool of claim 1, wherein the tool comprises at least one of a finishing nailer, a framing nailer, or a concrete nailer.

8. The power tool of claim 1, wherein the control unit further comprises a controller electrically coupled to gates of the first plurality of power switches and gates of the second plurality of power switches.

9. The power tool of claim 1, wherein the control unit further comprises a potting boat in which the circuit boat is disposed, and potting material substantially covering both surfaces of the circuit board but leaving a surface of the heat sink exposed.

10. The power tool of claim 1, wherein the control unit further comprises a thermally-conductive and electrically-insulating pad disposed over the heat sink and at least a portion of the power terminals, and a secondary heat sink disposed over the pad to be in thermal communication the heat sink and the power terminals.

11. The power tool of claim 10, wherein the secondary heat sink has three to six times the total size of the heat sink.

12. The power tool of claim 10, wherein the secondary heat sink comprises a plurality of upwardly projecting fins.

\* \* \* \* \*